US010698442B2

(12) United States Patent
Li (10) Patent No.: US 10,698,442 B2
(45) Date of Patent: Jun. 30, 2020

(54) METHOD AND APPARATUS FOR ALWAYS-ON DISPLAY APPLIED IN A DISPLAY DRIVER INTEGRATED CIRCUIT

(71) Applicant: Beijing Xiaomi Mobile Software Co., Ltd., Beijing (CN)

(72) Inventor: Guosheng Li, Beijing (CN)

(73) Assignee: Beijing Xiaomi Mobile Software Co., Ltd., Beijing (CN)

(*) Notice: Subject to any disclaimer, the term of this patent is extended or adjusted under 35 U.S.C. 154(b) by 16 days.

(21) Appl. No.: 15/862,943

(22) Filed: Jan. 5, 2018

(65) Prior Publication Data
US 2019/0011948 A1    Jan. 10, 2019

(30) Foreign Application Priority Data
Jul. 4, 2017   (CN) .......................... 2017 1 0538586

(51) Int. Cl.
*H04N 5/64* (2006.01)
*H05K 5/00* (2006.01)
(Continued)

(52) U.S. Cl.
CPC .......... *G06F 1/1605* (2013.01); *G06F 3/0482* (2013.01); *G06F 3/04817* (2013.01);
(Continued)

(58) Field of Classification Search
CPC ... G06F 1/1605; G06F 3/04817; G06F 3/0482
(Continued)

(56) References Cited

U.S. PATENT DOCUMENTS

| 4,150,535 A * | 4/1979 | Morokawa ............. G04C 3/005 |
| | | 368/156 |
| 4,279,012 A * | 7/1981 | Beckedorff .......... G05B 19/102 |
| | | 307/141.4 |

(Continued)

FOREIGN PATENT DOCUMENTS

| CN | 101771549 A | 7/2010 |
| CN | 103034115 A | 4/2013 |

(Continued)

OTHER PUBLICATIONS

Extended European Search Report issued in corresponding European Patent Application No. 18154565.8, dated May 25, 2018, 14 pages.

(Continued)

*Primary Examiner* — Cesar B Paula
*Assistant Examiner* — Luu-Phuong T Nguyen
(74) *Attorney, Agent, or Firm* — Arch & Lake LLP (57) ABSTRACT

The present disclosure discloses a method and apparatus for always-on display, and a computer-readable storage medium. The method includes: acquiring a plurality of content elements, a plurality of element meanings and a plurality of storage locations required for the always-on display, where each content element corresponds to an element meaning and a storage location; determining target information content, where the target information content needs to be displayed through an always-on display function; acquiring a content element required for displaying the target information content from the plurality of content elements based on the target information content, the plurality of element meanings, and the plurality of storage locations; and displaying the target information content through the always-on display function based on the acquired content element.

15 Claims, 4 Drawing Sheets

(51) Int. Cl.
  *H01J 17/49* (2012.01)
  *G06F 1/16* (2006.01)
  *G09G 3/20* (2006.01)
  *G06F 3/0481* (2013.01)
  *G06F 3/0482* (2013.01)

(52) U.S. Cl.
  CPC ......... *G09G 3/20* (2013.01); *G09G 2330/021* (2013.01); *G09G 2330/026* (2013.01)

(58) Field of Classification Search
  USPC ......................................................... 715/273
  See application file for complete search history.

(56) References Cited

U.S. PATENT DOCUMENTS

| | | | | |
|---|---|---|---|---|
| 4,540,292 A * | 9/1985 | Rubenstein | G09F 9/00 | 368/29 |
| 5,822,600 A * | 10/1998 | Hallowell | G06F 1/30 | 713/340 |
| 6,169,942 B1 * | 1/2001 | Miller | G07C 5/04 | 60/248 |
| 6,415,098 B1 * | 7/2002 | Taira | G11B 27/034 | 386/241 |
| 9,152,211 B2 * | 10/2015 | Gunn | G06F 3/0488 | |
| 2006/0001601 A1 * | 1/2006 | Ono | G09G 3/20 | 345/60 |
| 2006/0241868 A1 * | 10/2006 | Sun | G16B 50/00 | 702/19 |
| 2014/0118272 A1 * | 5/2014 | Gunn | G06F 3/0488 | 345/173 |
| 2014/0281607 A1 | 9/2014 | Tse | | |
| 2015/0138046 A1 * | 5/2015 | Moon | G06F 3/0416 | 345/7 |
| 2015/0179113 A1 * | 6/2015 | Hunt | G09G 3/3406 | 345/4 |
| 2015/0185811 A1 * | 7/2015 | Connell | G06T 1/60 | 345/173 |
| 2015/0185815 A1 * | 7/2015 | DeBates | G06F 1/3209 | 713/320 |
| 2015/0277545 A1 * | 10/2015 | Flowers | G06F 1/3296 | 713/323 |
| 2016/0027146 A1 | 1/2016 | Kim et al. | | |
| 2016/0116598 A1 * | 4/2016 | Wu | G01S 19/23 | 342/357.62 |
| 2018/0129268 A1 * | 5/2018 | Lee | G06F 1/3287 | |
| 2018/0176748 A1 * | 6/2018 | Kim | H04W 76/11 | |
| 2018/0204303 A1 * | 7/2018 | Bae | G09G 3/20 | |

FOREIGN PATENT DOCUMENTS

| | | |
|---|---|---|
| CN | 103530023 A | 1/2014 |
| CN | 104125141 A | 10/2014 |
| CN | 105204350 A | 12/2015 |
| CN | 105306710 A | 2/2016 |
| CN | 105892618A A | 8/2016 |
| CN | 106095473 A | 11/2016 |
| CN | 106814789 A | 6/2017 |
| JP | 5171574 B2 | 3/2013 |
| WO | 2017010822 A | 1/2017 |

OTHER PUBLICATIONS

European Examination Report issued in EP18154565.8, dated Mar. 29, 2019, 27 pages.
Summons of Oral Proceedings corresponding to European Patent Application No. 18154565.8 dated Feb. 3, 2020, (13p).
Office Action issued to Chinese Patent Application No. 201710538586.0 dated Mar. 30, 2020 with Concise English translation, (10p).

* cited by examiner

METHOD AND APPARATUS FOR ALWAYS-ON DISPLAY APPLIED IN A DISPLAY DRIVER INTEGRATED CIRCUIT

CROSS-REFERENCE TO RELATED APPLICATIONS

This application is based on and claims priority to Chinese Patent Application No. 201710538586.0 filed on Jul. 4, 2017, which is incorporated herein by reference in its entirety.

TECHNICAL FIELD

The present disclosure relates to the technical field of information processing, and more particularly to a method and apparatus for always-on display, and a computer-readable storage medium.

BACKGROUND

With the popularity of smart terminals such as smart phones, tablet computers and and the like, users use smart terminals a lot. According to statistics, a user views a smart phone about 150 times per day by lighting up the screen. Most users view the smart phone just to view the time and notification messages. Therefore, in order to facilitate users to obtain time and notification messages, a method for always-on display may be introduced.

SUMMARY

The present disclosure provides a method and apparatus for always-on display, and a computer-readable storage medium.

According to a first aspect of the present disclosure, a method for always-on display applied in a Display Driver Integrated Circuit (DDIC) is provided. The method may include: acquiring a plurality of content elements, a plurality of element meanings and a plurality of storage locations required for the always-on display, where each content element corresponds to an element meaning and a storage location; determining target information content, where the target information content needs to be displayed through an always-on display function; acquiring a content element required for displaying the target information content from the plurality of content elements based on the target information content, the plurality of element meanings, and the plurality of storage locations; and displaying the target information content through the always-on display function based on the acquired content element.

According to a second aspect of the present disclosure, an apparatus for always-on display applied in a DDIC is provided. The apparatus may include: a processor; and a memory for storing instructions executable by the processor, where the processor is configured to: acquire a plurality of content elements, a plurality of element meanings and a plurality of storage locations required for the always-on display, where each content element corresponds to an element meaning and a storage location; determine target information content, where the target information content needs to be displayed through an always-on display function; acquire a content element required for displaying the target information content from the plurality of content elements based on the target information content, the plurality of element meanings, and the plurality of storage locations; and display the target information content through the always-on display function based on the acquired content element.

According to a third aspect of the present disclosure, there provides a non-transitory computer-readable storage medium having instructions stored thereon that, when executed by a processor, may cause the processor to acquire a plurality of content elements, a plurality of element meanings and a plurality of storage locations required for the always-on display, where each content element corresponds to an element meaning and a storage location; determine target information content, where the target information content needs to be displayed through an always-on display function; acquire a content element required for displaying the target information content from the plurality of content elements based on the target information content, the plurality of element meanings, and the plurality of storage locations; and display the target information content through the always-on display function based on the acquired content element.

It is to be understood that both the forgoing general description and the following detailed description are exemplary and illustrative only, and are not restrictive of the present disclosure.

BRIEF DESCRIPTION OF THE DRAWINGS

The drawings are incorporated in, and formed a part of, the specification to show examples in conformity with the disclosure, and are for the purpose of illustrating the principles of the disclosure along with the specification.

Skilled artisans will appreciate that elements in the figures are illustrated for simplicity and clarity and have not necessarily been drawn to scale. For example, the dimensions and/or relative positioning of some of the elements in the figures may be exaggerated relative to other elements to help to improve understanding of various examples of the present disclosure. Also, common but well-understood elements that are useful or necessary in a commercially feasible example are often not depicted in order to facilitate a less obstructed view of these various examples. It will further be appreciated that certain actions and/or steps may be described or depicted in a particular order of occurrence while those skilled in the art will understand that such specificity with respect to sequence is not actually required. It will also be understood that the terms and expressions used herein have the ordinary technical meaning as is accorded to such terms and expressions by persons skilled in the technical field as set forth above, except where different specific meanings have otherwise been set forth herein.

DETAILED DESCRIPTION

In order to make the purpose, technical solutions and advantages of the present disclosure more clear, the examples of the present disclosure are described in further detail below with reference to the accompanying drawings.

The terminology used in the present disclosure is for the purpose of describing exemplary examples only and is not intended to limit the present disclosure. As used in the present disclosure and the appended claims, the singular forms "a," "an" and "the" are intended to include the plural forms as well, unless the context clearly indicates otherwise. It shall also be understood that the terms "or" and "and/or" used herein are intended to signify and include any or all possible combinations of one or more of the associated listed items, unless the context clearly indicates otherwise.

It shall be understood that, although the terms "first," "second," "third," and the like may be used herein to describe various information, the information should not be limited by these terms. These terms are only used to distinguish one category of information from another. For example, without departing from the scope of the present disclosure, first information may be termed as second information; and similarly, second information may also be termed as first information. As used herein, the term "if" may be understood to mean "when" or "upon" or "in response to" depending on the context.

Application scenarios of examples of the present disclosure will be described before explaining the examples of the present disclosure in detail. At present, smart terminals such as smart phones, tablet computers and so on are widely used in daily life. A user may acquire all kinds of information through a smart terminal. When the user does not use the smart terminal, the screen of the smart terminal may be turned off by operating a specified key. When the screen of the smart terminal is in the off state, the user may want to acquire the current time through the smart terminal. Alternatively, when the screen of the smart terminal is in the off state and the smart terminal receives a notification message, the user may want to view the notification message. A method for always-on display provided by the examples of the present disclosure may be used in the above-mentioned scenarios. When the screen of the smart terminal is in the off state, the smart terminal may adopt the method for always-on display provided by the examples of the present disclosure, to display the time and notification message by keeping a part of the screen area always on, so as to be viewed by the user at any time.

A smart terminal may keep only a part of the screen area always on to display the time and notification messages. An Application Processor (AP) of the smart terminal may output preset content elements to a Display Driver Integrated Circuit (DDIC), and then, if the always-on display function of the smart terminal is enabled, the DDIC of the smart terminal may calculate the system time at the moment, and acquire content elements from the preset content elements according to the system time at the moment for displaying.

Since the DDIC of the smart terminal does not know what the specific meaning of preset content elements transmitted by the AP is, when the DDIC acquires a content element to display from the preset content elements according to the calculated system time, the acquired content element may be likely to be wrong and may not express the system time, that is, when the DDIC displays the system time based on the acquired content element, the displayed contents may be wrong.

In order to solve the above-mentioned technical problems, the examples of the present disclosure provide a method for always-on display, and then the method for always-on display will be described in detail by means of the following examples with reference to the accompanying drawings.

Figure 1:
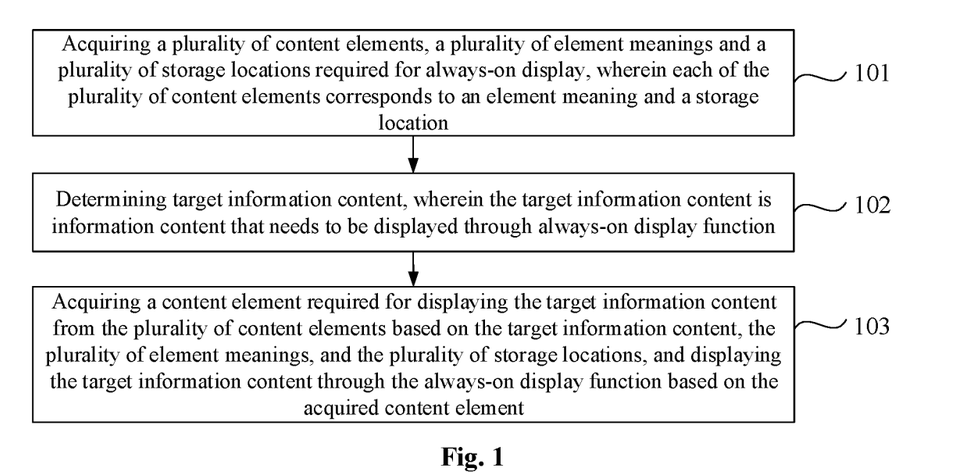
FIG. 1 is a flow chart showing a method for always-on display according to an example.

FIG. 1 is a flow chart showing a method for always-on display according to an example. As shown in FIG. 1, the method for always-on display may be applied in a DDIC of a smart terminal and may include the following steps.

In step 101, a plurality of content elements, a plurality of element meanings and a plurality of storage locations required for always-on display are acquired, wherein each of the plurality of content elements corresponds to an element meaning and a storage location.

In step 102, target information content is determined, wherein the target information content is information content that needs to be displayed through always-on display function.

In step 103, a content element required for displaying the target information content is acquired from the plurality of content elements based on the target information content, the plurality of element meanings, and the plurality of storage locations, and the target information content is displayed through the always-on display function based on the acquired content element.

In the examples of the present disclosure, the DDIC of the smart terminal may acquire a plurality of content elements, a plurality of element meanings and a plurality of storage locations required for always-on display in advance, and then, after the DDIC determines information content to be displayed, the DDIC may acquire a content element required for displaying the information content to be displayed from the plurality of content elements based on the information content to be displayed, the plurality of element meanings, and the plurality of storage locations, that is, the DDIC may analyze the acquired content elements by itself and automatically acquire the corresponding content element to display according to the target information content, avoiding the problems of display errors in caused by that the DDIC fails to know the specific meaning of a content element, ensuring the accuracy of always-on display while saving power consumption.

Optionally, the determining target information content may include: acquiring reference time, which is system time acquired from an application processor (AP) when a screen is turned off; counting time from acquiring the reference time to obtain an elapsed time value for indicating the time that has elapsed since the reference time is acquired; if system time is required to be displayed through the always-on display function at the moment, adding the reference time to the elapsed time value obtained by counting time at the moment to obtain system time at the moment; and determining the system time at the moment as the target information content.

Optionally, the acquiring a content element required for displaying the target information content from the plurality of content elements based on the target information content, the plurality of element meanings, and the plurality of storage locations may include: determining a plurality of display elements included in the system time at the moment; determining, for each of the plurality of display elements, an element meaning which is the same as that of the display element from the plurality of element meanings; acquiring a content element corresponding to the display element from a storage location corresponding to the determined element meaning; and determining the acquired content element corresponding to each of the display elements as a content element required for displaying the target information content.

Optionally, after the determining a plurality of display elements included in the system time at the moment, the method may further include: determining a display order of the plurality of display elements; wherein the displaying the target information content through the always-on display function based on the acquired content element comprises: displaying content elements corresponding to the plurality of display elements in the display order at preset display positions, wherein the preset display positions are preset positions at which the plurality of display elements are to be displayed in the screen.

Optionally, the determining target information content may include: if a notification message is received, determining the notification message as the target information content, wherein the notification message is a message for prompting that new information is received.

Optionally, the acquiring a content element required for displaying the target information content from the plurality of content elements based on the target information content, the plurality of element meanings, and the plurality of storage locations may include: determining a message type to which the notification message belongs; determining an element meaning that is the same as the message type from the plurality of element meanings; and acquiring a content element from a storage location corresponding to the determined element meaning, and determining the acquired content element as a content element required for displaying the target information content.

All the optional solutions described above may form optional examples of the present disclosure in any combination, which will not be described in detail in examples of the present disclosure.

Usually, the DDIC of the smart terminal may display the following two types of information content through the always-on display function: one is time, and the other one is notification messages. The smart terminal may only display time and may also only display a notification message, and may also display both time and a notification message simultaneously. According to different types of information content to be displayed, the DDIC of the smart terminal may display by using different methods for always-on display. A method for always-on display of time and a method for always-on display of a notification message will be explained in detail below with reference to the drawings respectively.

Figure 2:
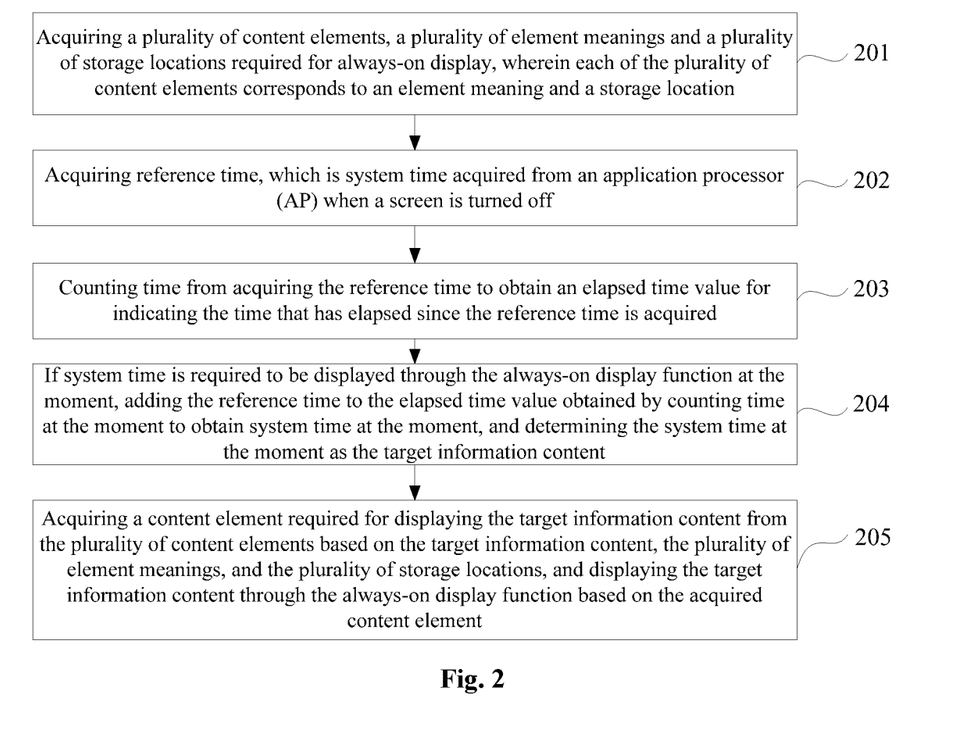
FIG. 2 is a flow chart showing another method for always-on display according to an example.

FIG. 2 is a flow chart showing a method for always-on display according to an example. As shown in FIG. 2, the method may be applied in a DDIC of a smart terminal and may include the following steps.

In step 201, a plurality of content elements, a plurality of element meanings and a plurality of storage locations required for always-on display are acquired, wherein each of the plurality of content elements corresponds to an element meaning and a storage location.

In the examples of the present disclosure, when the initialization of the DDIC of the smart terminal is completed or when the smart terminal detects that the always-on display function is activated, the AP of the smart terminal may transmit to the DDIC of the smart terminal a plurality of content elements, a plurality of element meanings and a plurality of storage locations that are stored and required for always-on display. The plurality of content elements may be a background image required for always-on display, picture data of a digital number required for displaying time, such as image data of 0-9, and may also include an icon for a notification message or the like.

For each of the plurality of content elements, the AP of the smart terminal may transmit an element meaning and a storage location corresponding to the content element while transmitting the content element. After the DDIC receives the content element, the element meaning, and the storage location, the content element may be stored in the storage location and a correspondence between the element meaning and the storage location may be generated.

It is to be noted that the user may self-select the information content that needs to be displayed through the always-on display function, and the plurality of content elements required for the always-on display may be determined based on the information content selected by the user.

For example, the user may select a background image during the always-on display. In addition, if the user only wants to display time through the always-on display function, the user may select through the smart terminal to only display time. At this time, the AP of the smart terminal may transmit bitmaps of 0-9 for displaying time and the corresponding meaning and storage location for each bitmap to the DDIC. If the user also wants to display date through the always-on display function, then the AP of the smart terminal may transmit bitmaps of year, month, day, and the corresponding meaning and storage location for each bitmap to the DDIC. Alternatively, if the user also wants to display a notification message through the always-on display function, the AP of the smart terminal may transmit different icons of notification messages and the corresponding meaning and storage location for each icon to the DDIC after the user selects through the smart terminal to display a notification message.

It is to be noted that the above is only a list of some of the information content commonly used to be displayed through the always-on display function in practice, and does not cover all possible information content, for example, information content to be displayed through the always-on display function may also include weather information, week and so on.

After a plurality of content elements, a plurality of element meanings and a plurality of storage locations required for always-on display are acquired, the DDIC of the smart terminal may determine target information content, wherein the target information content is information content that needs to be displayed through always-on display function. Here, if the time is to be displayed, the DDIC of the smart terminal may determine the specific target information content that needs to be displayed by the steps 202-204.

In step 202, reference time is acquired, wherein reference time is system time acquired from an application processor (AP) when a screen is turned off.

Since the DDIC fails to obtain the system time during the always-on display, when the smart terminal detects that the screen is turned off, the AP of the smart terminal may acquire the system time and output the acquired system time to the DDIC of the smart terminal. The DDIC of the smart terminal may treat the system time as the reference time, and determine the target information content to be displayed based on the method described in the subsequent steps.

It should be noted that the reference time output to the DDIC by the AP of the smart terminal may not only include hours, minutes and seconds, but also may include time information regarding morning or afternoon and date information regarding year, month and day.

In step 203, time is counted from acquiring the reference time to obtain an elapsed time value for indicating the time that has elapsed since the reference time is acquired.

After the DDIC of the smart terminal acquires the reference time, the DDIC may count time by its own crystal oscillator. The DDIC counts time from the moment that the reference time is acquired, so that if system time is required to be displayed at the moment, the DDIC may obtain the time that has already elapsed from the reference time to the current time, that is, the elapsed time value from the reference time to the current time.

In step 204, if system time is required to be displayed through the always-on display function at the moment, the reference time is added to the elapsed time value obtained by counting time at the moment to obtain system time at the moment, and the system time at the moment is determined as the target information content.

After the DDIC of the smart terminal determines the elapsed time value from the reference time to the current time, if system time is required to be displayed through the always-on display function at the moment, the DDIC may add the reference time to the elapsed time value obtained at the moment to obtain system time at the moment. The system time at the moment is namely the target information content.

The DDIC may divide the system time at the moment into a minute segment and a hour segment, and then the DDIC may determine whether the value of the minute segment of the system time at the moment is 60, and if the value of the minute segment of the system time at the moment is 60, the minute segment of the system time at the moment is reset to 0 and the hour segment of the system time at the moment is incremented by 1. At this time, the DDIC may determine the processed system time at the moment as the target information content.

Further, if the reference time acquired by the DDIC also includes information regarding morning or afternoon and information regarding year, month and day and so on, then the DDIC may also determine whether the current time is in the morning or in the afternoon based on the system time at the moment. For date information regarding year, month and day, the DDIC may detect whether the system time at the moment is 00:00, and if the system time at the moment is 00:00, the DDIC may add one day to the date information regarding year, month and day in the acquired reference time. Further, after the DDIC adds one day to the date information in the reference time, it is also possible to determine whether the current date is greater than the total number of days in the current month. If the current date is greater than the total number of days in the current month, then the DDIC may increment the current month by 1, and the determined current date is reset to 1. Alternatively, the smart terminal may also automatically wake up the AP to acquire system time if 00:00 is detected, and update the reference time according to the acquired system time. At this time, the DDIC of the smart terminal may determine the updated reference time as the target information content.

In step 205, a content element required for displaying the target information content is acquired from the plurality of content elements based on the target information content, the plurality of element meanings, and the plurality of storage locations, and the target information content is displayed through the always-on display function based on the acquired content element.

After it is determined that the target information content is the system time at the moment, the DDIC of the smart terminal may determine a plurality of display elements included in the system time at the moment; determine, for each of the plurality of display elements, an element meaning which is the same as that of the display element from the plurality of element meanings; acquiring a content element corresponding to the display element from a storage location corresponding to the determined element meaning; and determine the acquired content element corresponding to each of the display elements as a content element required for displaying the target information content.

Based on the description of the foregoing steps, it can be known that the target information content is the system time at the moment. The system time at the moment includes at least hours and minutes, and representing the hours usually requires at least one number and representing the minutes usually also requires at least one number, that is, there may be at least one display element for displaying the hours, and there may also be at least one display element for displaying the minutes. After the DDIC determines the target information content, the numbers required for displaying the system time at the moment may be determined, that is, a plurality of display elements included in the system time at the moment may be determined. After the plurality of display elements are determined, the DDIC may determine element meanings that are the same as that of each of the display elements respectively from the plurality of acquired element meanings sequentially in the order of the plurality of display elements, and thereafter, the DDIC may acquire storage locations corresponding to the determined element meanings from a correspondence between element meanings and storage locations, and may acquire the corresponding content elements from the storage locations.

For example, it is assumed that the system time at the moment is 12:05, then at this time, the DDIC may determine that the system time includes five display elements, namely "1", "2", ":", "0", and "5". After that, the DDIC may first find an element meaning with the element meaning of 1 from the plurality of element meanings. After the element meaning corresponding to 1 is found, the DDIC may acquire a storage location corresponding to the element meaning of 1, and acquire from the storage location an image representing 1, that is, a content element corresponding to 1. For the remaining "2", ":", "0", and "5", the DDIC may also use the same method described above to find, and finally acquire five content elements representing "1", "2", ":", "0", and "5" respectively.

After content elements corresponding to each of the display elements included in the target information content respectively are acquired, the DDIC may display content elements corresponding to the plurality of display elements in the display order of the plurality of display elements at preset display positions, wherein the preset display positions are preset positions at which the plurality of display elements are to be displayed in the screen.

The DDIC may arrange the plurality of display elements in accordance with the display order corresponding to each display element, after that, the DDIC may acquire the preset display positions, and display the plurality of display elements in the arranged order at the preset display positions.

It is to be noted that, in general, the system time is displayed horizontally, that is, the plurality of display elements included in the system time at the moment are displayed on the same line. Display position coordinates of the system time may be preset in the DDIC of the smart terminal. Longitudinal coordinate in the display position coordinates determine positions away from the upper and lower edges of the screen which the system time is displayed at, and lateral coordinate in the display position coordinates determine the positions away from the left and right edges of the screen which the system time is displayed at. The lateral coordinate in the display position coordinates may be the distance from the leftmost display element in the system time to the left edge of the screen, and the lateral coordinate may also be a coordinate based on other base points. Since the plurality of display elements are displayed on the same line, the DDIC may determine the longitudinal coordinate in the display position coordinates as the longitudinal coordinate at the time of displaying the plurality of display elements. And for the lateral coordinate, if the lateral coordinate is the distance from the leftmost display element in the system time to the left edge of the screen, then the DDIC may use the lateral coordinate as the lateral coordinate of the leftmost display element of the plurality of display elements in terms of the display order, and lateral coordinates of the following display elements are sequentially determined in the display order. After the DDIC determines the lateral and longitudinal coordinates at the time of displaying the plurality of display elements, the plurality of display elements may be displayed in accordance with the determined lateral and longitudinal coordinates.

Optionally, if displaying the system time at the moment is not the first time to display system time through the always-on display function, then for ease of operation, the DDIC may directly acquire display positions of a plurality of display elements of system time at the last time of displaying system time, and a one-to-one correspondence between a plurality of display elements included in system time at the moment and the plurality of display elements of system time at the last time of displaying system time is determined based on the display order. After the correspondence, for each of the plurality of display elements included in the system time at the moment, the DDIC may directly acquire a display position corresponding to a display element in the last system time corresponding to the display element, and display the plurality of display elements in the system time at the moment based on the acquired display position of each display element.

In the examples of the present disclosure, the DDIC may determine, according to the determined target information content, an element meaning corresponding to a display element included in the target information content from the plurality of element meanings acquired in advance, and acquire a corresponding content element from a corresponding storage location according to the determined element meaning. The acquired content element is namely a content element required for displaying the target information content. It can be seen that the DDIC may analyze the acquired content elements through the plurality of acquired element meanings, and automatically acquire the corresponding content element to display according to the target information content, avoiding the problems of display errors caused by that the DDIC fails to know the specific meaning of a content element, ensuring the accuracy of always-on display while saving power consumption.

Figure 3:
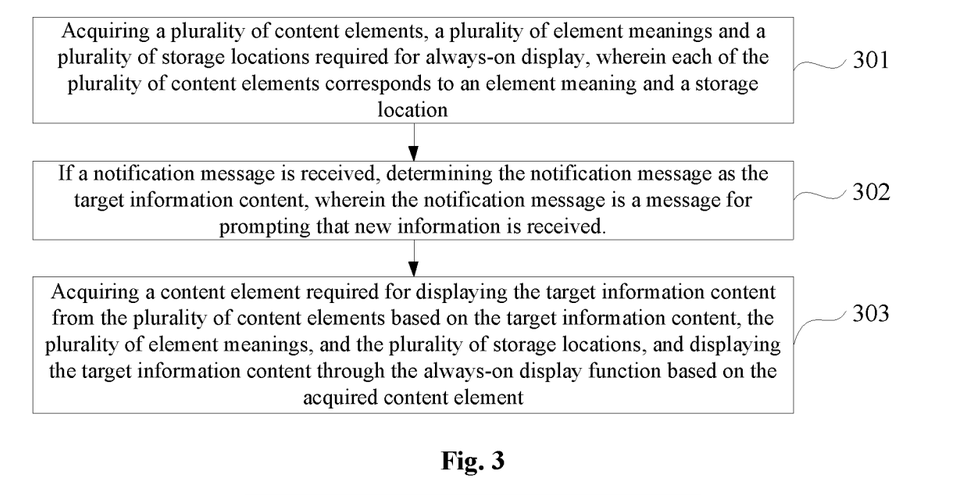
FIG. 3 is a flow chart showing yet another method for always-on display according to an example.

In the examples of the present disclosure, the implementation of displaying time through the always-on display function is described in the above examples in conjunction with FIG. 2, and the specific implementation of displaying a notification message through the always-on display function will be described below with reference to FIG. 3. FIG. 3 is a flow chart showing a method for always-on display according to an example. As shown in FIG. 3, the method may be applied in a DDIC of a smart terminal and may include the following steps.

In step 301, a plurality of content elements, a plurality of element meanings and a plurality of storage locations required for always-on display are acquired, wherein each of the plurality of content elements corresponds to an element meaning and a storage location.

The implementation of this step may refer to the implementation of step 201 in the examples described above. It is to be noted that if information content selected by the user that needs to be displayed through the always-on display function includes a notification message, content elements transmitted by the AP of the smart terminal to the DDIC may include a notification icon of a telephone, a text message, a common application and other content elements.

In step 302, if a notification message is received, the notification message is determined as the target information content, wherein the notification message is a message for prompting that new information is received.

During the always-on display or before the always-on display function is activated, if new information is received, the smart terminal may generate a notification message based on the new information, and transmit the notification message to the DDIC. After the DDIC receives the notification message, the notification message may be determined as the target information content. The new information may be information received after the reference time, and may also be unread information. That is, the new information may be information received after the screen of the smart terminal is turned off, or may be information that has been received before the screen of the smart terminal is turned off but has not been read.

In step 303, a content element required for displaying the target information content is acquired from the plurality of content elements based on the target information content, the plurality of element meanings, and the plurality of storage locations, and the target information content is displayed through the always-on display function based on the acquired content element.

After determining that the target information content is a notification message, the DDIC may determine a message type of the notification message, then the DDIC may determine an element meaning that is the same as the message type from the plurality of element meanings; acquire a content element from a storage location corresponding to the determined element meaning, and determine the acquired content element as a content element required for displaying the target information content.

The message type of the notification message may be a message type that the AP of the smart terminal carries when transmitting the notification message to the DDIC.

For example, after the smart terminal receives a new text message, the smart terminal may generate a text message notification message based on the new text message. When the AP of the smart terminal transmits the text message notification message to the DDIC, information for indicating the message type of the notification message is a text message may be carried in the text message notification message. During the always-on display, the DDIC may determine that the message type of the notification message is a text message, and then may find an element meaning representing a text message from the plurality of element meanings. After the DDIC finds the element meaning representing a text message, a text message icon may be acquired from a storage location corresponding to the element meaning, wherein the text message icon is namely a content element for displaying the text message notification message.

After content elements required for displaying the target information content are acquired, the DDIC may display the target information content based on preset display positions. The specific implementation in which the DDIC displays the target information content based on the preset display positions may refer to the related implementation in step 205, which will not be described in detail in the examples of the present disclosure.

It is to be noted that, during the always-on display, the DDIC may only display time, and may also only display a notification message. Time and a notification message may also be displayed at the same time. If time and a notification message are displayed at the same time, the implementations introduced in the above examples of displaying time and displaying a notification messages may be referenced at the same time, to implement simultaneous display of time and a notification message.

In the examples of the present disclosure, the DDIC may determine, according to the determined target information content, an element meaning corresponding to a display element included in the target information content from the plurality of element meanings acquired in advance, and acquire a corresponding content element from a corresponding storage location according to the determined element meaning. The acquired content element is namely a content element required for displaying the target information content. It can be seen that the DDIC may analyze the acquired content elements through the plurality of acquired element meanings, and automatically acquire the corresponding content element to display according to the target information content, avoiding the problems of display errors caused by that the DDIC fails to know the specific meaning of a content element, ensuring the accuracy of always-on display while saving power consumption.

After explaining the methods provided in the examples of the present disclosure, the apparatus provided in the examples of the present disclosure will be described later.

Figure 4A:
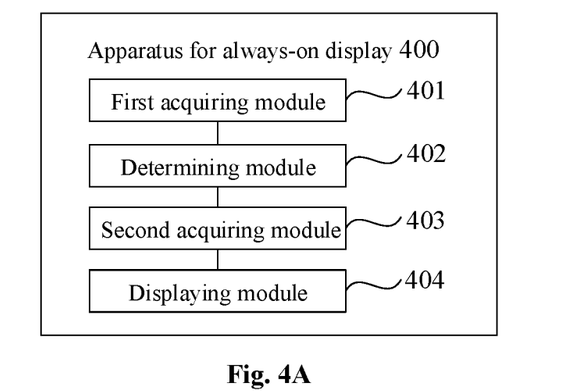
FIG. 4A is a block diagram showing an apparatus for always-on display according to an example.

FIG. 4A is a block diagram showing an apparatus for always-on display according to an example. The apparatus for always-on display may be included in a smart terminal. With reference to FIG. 4A, the apparatus includes a first acquiring module 401 configured to acquire a plurality of content elements, a plurality of element meanings and a plurality of storage locations required for always-on display, wherein each of the plurality of content elements corresponds to an element meaning and a storage location; a determining module 402 configured to determine target information content, wherein the target information content is information content that needs to be displayed through always-on display function; a second acquiring module 403 configured to acquire a content element required for displaying the target information content from the plurality of content elements based on the target information content, the plurality of element meanings, and the plurality of storage locations; and a displaying module 404 configured to display the target information content through the always-on display function based on the acquired content element.

Figure 4B:
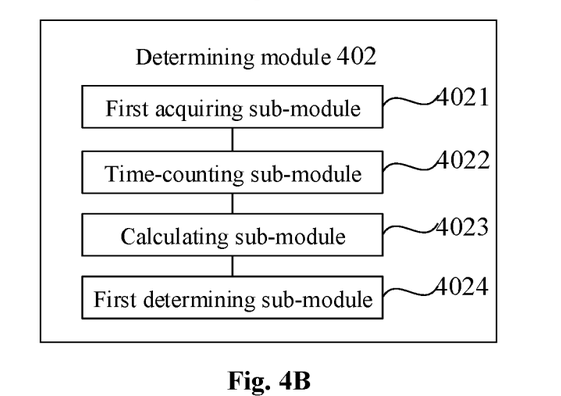
FIG. 4B is a block diagram showing a determining module according to an example.

Optionally, with reference to FIG. 4B, the determining module 402 may include: a first acquiring sub-module 4021 configured to acquire reference time, which is system time acquired from an application processor (AP) when a screen is turned off; a time-counting sub-module 4022 configured to count time from acquiring the reference time to obtain an elapsed time value for indicating the time that has elapsed since the reference time is acquired; a calculating sub-module 4023 configured to, if system time is required to be displayed through the always-on display function at the moment, add the reference time to the elapsed time value obtained by counting time at the moment to obtain system time at the moment; and a first determining sub-module 4024 configured to determine the system time at the moment as the target information content.

Figure 4C:
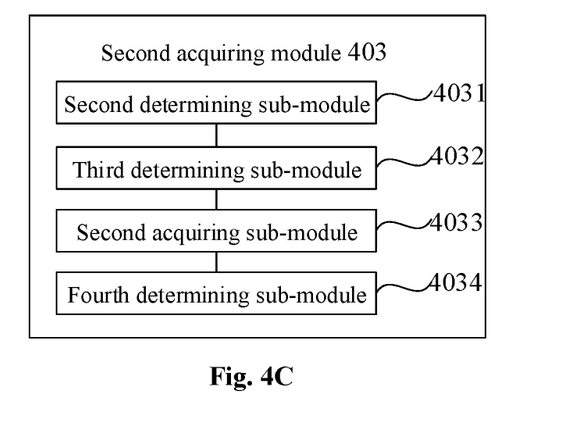
FIG. 4C is a block diagram showing a second acquiring module according to an example.

Optionally, with reference to FIG. 4C, the second acquiring module 403 may include: a second determining sub-module 4031 configured to determine a plurality of display elements included in the system time at the moment; a third determining sub-module 4032 configured to determine, for each of the plurality of display elements, an element meaning which is the same as that of the display element from the plurality of element meanings; a second acquiring sub-module 4033 configured to acquire a content element corresponding to the display element from a storage location corresponding to the determined element meaning; and a fourth determining sub-module 4034 configured to determine the acquired content element corresponding to each of the display elements as a content element required for displaying the target information content.

Optionally, the second acquiring module may further include: a fifth determining sub-module configured to determine a display order of the plurality of display elements; wherein the displaying module is configured to display content elements corresponding to the plurality of display elements in the display order at preset display positions, wherein the preset display positions are preset positions at which the plurality of display elements are to be displayed in the screen.

Optionally, the determining module may include: a sixth determining sub-module configured to, if a notification message is received, determine the notification message as the target information content, wherein the notification message is a message for prompting that new information is received.

Optionally, the second acquiring module may include: a seventh determining sub-module configured to determine a message type to which the notification message belongs; an eighth determining sub-module configured to determine an element meaning that is the same as the message type from the plurality of element meanings; and a third acquiring module configured to acquire a content element from a storage location corresponding to the determined element meaning, and determine the acquired content element as a content element required for displaying the target information content.

With respect to the apparatuses of the examples described above, the manners in which the modules carry out the operations have been described in the examples of the methods, and will not be detailed here.

In the examples of the present disclosure, the DDIC may determine, according to the determined target information content, an element meaning corresponding to a display element included in the target information content from the plurality of element meanings acquired in advance, and acquire a corresponding content element from a corresponding storage location according to the determined element meaning. The acquired content element is namely a content element required for displaying the target information content. It can be seen that the DDIC may analyze the acquired content elements through the plurality of acquired element meanings, and automatically acquire the corresponding content element to display according to the target information content, avoiding the problems of display errors caused by that the DDIC fails to know the specific meaning of a content element, ensuring the accuracy of always-on display while saving power consumption.

Figure 5:
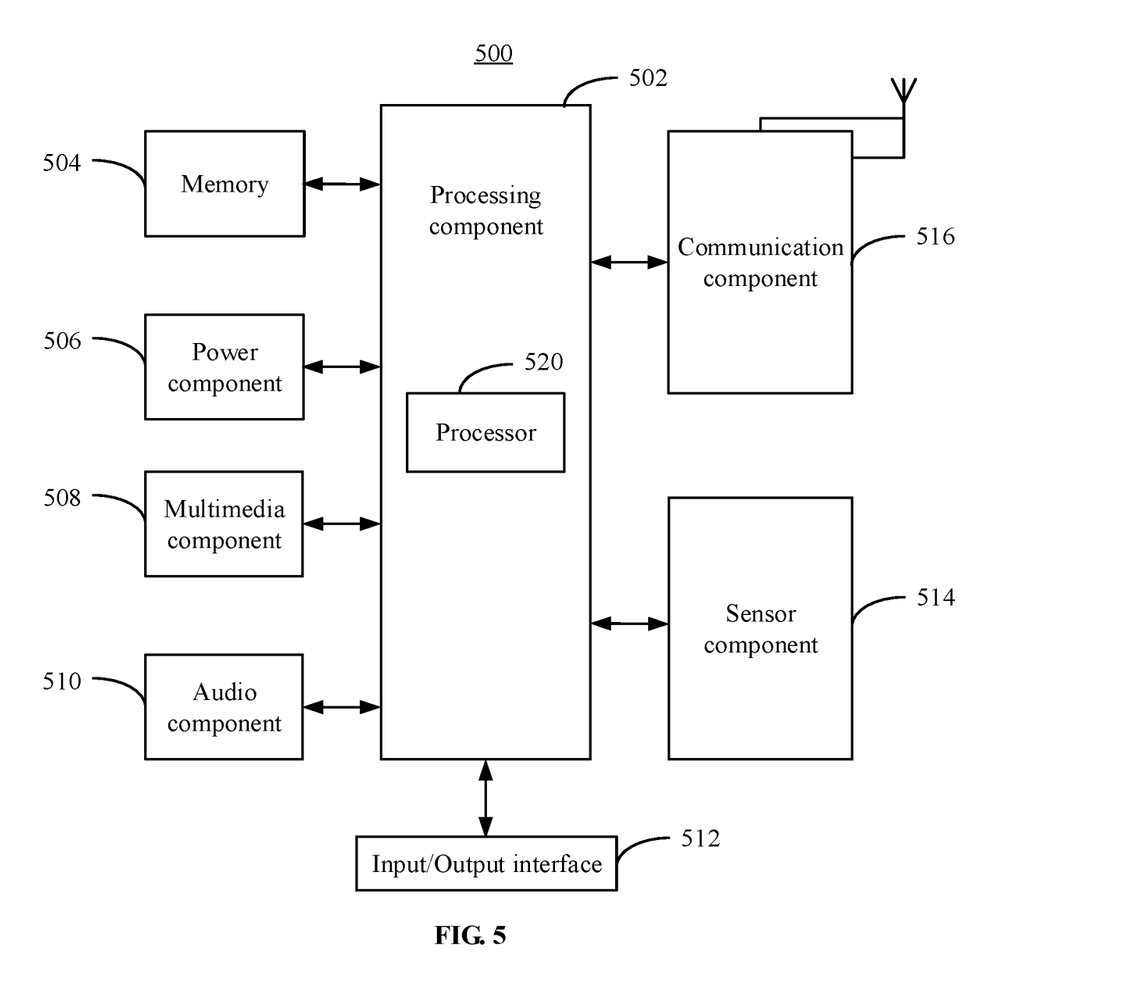
FIG. 5 is a block diagram showing an apparatus for always-on display according to an example.

FIG. 5 is a block diagram showing an apparatus 500 for always-on display according to an example. For example, the apparatus 500 may be a mobile phone, a computer, a digital broadcast terminal, a messaging device, a gaming console, a tablet, a medical device, an exercise equipment, a personal digital assistant, and the like.

Referring to FIG. 5, the apparatus 500 may include one or more of the following components: a processing component 502, a memory 504, a power component 506, a multimedia component 508, an audio component 510, an input/output (I/O) interface 512, a sensor component 514, and a communication component 516.

The processing component 502 generally controls overall operations of the apparatus 500, such as the operations associated with display, telephone calls, data communications, camera operations, and recording operations. The processing component 502 may include one or more processors 520 to execute instructions to perform all or part of the steps in the above described methods. Moreover, the processing component 502 may include one or more modules which facilitate the interaction between the processing component 502 and other components. For instance, the processing component 502 may include a multimedia module to facilitate the interaction between the multimedia component 508 and the processing component 502.

The memory 504 is configured to store various types of data to support the operation on the apparatus 500. Examples of such data include instructions for any applications or methods operated on the apparatus 500, contact data, phonebook data, messages, pictures, video, etc. The memory 504 may be implemented using any type of volatile or non-volatile memory devices, or a combination thereof, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic or optical disk.

The power component 506 provides power to various components of the apparatus 500. The power component 506 may include a power management system, one or more power sources, and any other components associated with the generation, management, and distribution of power for the apparatus 500.

The multimedia component 508 includes a screen providing an output interface between the apparatus 500 and the user. In some examples, the screen may include a liquid crystal display (LCD) and a touch panel (TP). If the screen includes the touch panel, the screen may be implemented as a touch screen to receive input signals from the user. The touch panel includes one or more touch sensors to sense touches, swipes, and gestures on the touch panel. The touch sensors may not only sense a boundary of a touch or swipe action, but also sense a period of time and a pressure associated with the touch or swipe action. In some examples, the multimedia component 508 includes a front camera and/or a rear camera. The front camera and the rear camera may receive an external multimedia datum while the apparatus 500 is in an operation mode, such as a photographing mode or a video mode. Each of the front camera and the rear camera may be a fixed optical lens system or have optical focusing and zooming capability.

The audio component 510 is configured to output and/or input audio signals. For example, the audio component 510 includes a microphone ("MIC") configured to receive an external audio signal when the apparatus 500 is in an operation mode, such as a call mode, a recording mode, and a voice recognition mode. The received audio signal may be further stored in the memory 504 or transmitted via the communication component 516. In some examples, the audio component 510 further includes a speaker to output audio signals.

The I/O interface 512 provides an interface between the processing component 502 and peripheral interface modules, the peripheral interface modules being, for example, a keyboard, a click wheel, buttons, and the like. The buttons may include, but are not limited to, a home button, a volume button, a starting button, and a locking button.

The sensor component 514 includes one or more sensors to provide status assessments of various aspects of the apparatus 500. For instance, the sensor component 514 may detect an open/closed status of the apparatus 500, relative positioning of components (e.g., the display and the keypad, of the apparatus 500). The sensor component 514 may further detect a change in position of the apparatus 500 or of a component of the apparatus 500, a presence or absence of user contact with the apparatus 500, an orientation or an acceleration/deceleration of the apparatus 500, and a change in temperature of the apparatus 500. The sensor component 514 may include a proximity sensor configured to detect the presence of a nearby object without any physical contact. The sensor component 514 may also include a light sensor, such as a CMOS or CCD image sensor, for use in imaging applications. In some examples, the sensor component 514 may also include an accelerometer sensor, a gyroscope sensor, a magnetic sensor, a pressure sensor, or a temperature sensor.

The communication component 516 is configured to facilitate communication, wired or wirelessly, between the apparatus 500 and other devices. The apparatus 500 can access a wireless network based on a communication standard, such as WiFi, 2G or 3G; or a combination thereof. In an example, the communication component 516 receives a broadcast signal or broadcast associated information from an external broadcast management system via a broadcast channel. In an example, the communication component 516 further includes a near field communication (NFC) module to facilitate short-range communications. For example, the NFC module may be implemented based on a radio frequency identification (RFID) technology, an infrared data association (IrDA) technology, an ultra-wideband (UWB) technology, a Bluetooth (BT) technology, and other technologies.

In examples, the apparatus 500 may be implemented with one or more application specific integrated circuits (ASICs), digital signal processors (DSPs), digital signal processing devices (DSPDs), programmable logic devices (PLDs), field programmable gate arrays (FPGAs), controllers, micro-controllers, microprocessors, or other electronic components, for performing the methods provided in examples shown in FIG. 2 and/or FIG. 3 described above.

In examples, also provided is a non-transitory computer-readable storage medium including instructions, such as included in the memory 504, executable by the processor 520 in the apparatus 500, for performing the above-described methods. For example, the non-transitory computer-readable storage medium may be a ROM, a random access memory (RAM), a CD-ROM, a magnetic tape, a floppy disc, an optical data storage device, and the like.

The present disclosure provides a non-transitory computer readable storage medium having stored therein instructions that, when executed by the processor of a mobile terminal, cause the mobile terminal to perform a method for always-on display. The method includes: acquiring a plurality of content elements, a plurality of element meanings and a plurality of storage locations required for always-on display, wherein each of the plurality of content elements corresponds to an element meaning and a storage location; determining target information content, wherein the target information content is information content that needs to be displayed through always-on display function; acquiring a content element required for displaying the target information content from the plurality of content elements based on the target information content, the plurality of element meanings, and the plurality of storage locations; and displaying the target information content through the always-on display function based on the acquired content element.

Optionally, the determining target information content may include: acquiring reference time, which is system time acquired from an application processor (AP) when a screen is turned off; counting time from acquiring the reference time to obtain an elapsed time value for indicating the time that has elapsed since the reference time is acquired; if system time is required to be displayed through the always-on display function at the moment, adding the reference time to the elapsed time value obtained by counting time at the moment to obtain system time at the moment; and determining the system time at the moment as the target information content.

Optionally, the acquiring a content element required for displaying the target information content from the plurality of content elements based on the target information content, the plurality of element meanings, and the plurality of storage locations may include: determining a plurality of display elements included in the system time at the moment; determining, for each of the plurality of display elements, an element meaning which is the same as that of the display element from the plurality of element meanings; acquiring a content element corresponding to the display element from a storage location corresponding to the determined element meaning; and determining the acquired content element corresponding to each of the display elements as a content element required for displaying the target information content.

Optionally, after the determining a plurality of display elements included in the system time at the moment, the method may further include: determining a display order of the plurality of display elements; wherein the displaying the target information content through the always-on display function based on the acquired content element comprises: displaying content elements corresponding to the plurality of display elements in the display order at preset display positions, wherein the preset display positions are preset positions at which the plurality of display elements are to be displayed in the screen.

Optionally, the determining target information content may include: if a notification message is received, determining the notification message as the target information content, wherein the notification message is a message for prompting that new information is received.

Optionally, the acquiring a content element required for displaying the target information content from the plurality of content elements based on the target information content, the plurality of element meanings, and the plurality of storage locations may include: determining a message type to which the notification message belongs; determining an element meaning that is the same as the message type from the plurality of element meanings; and acquiring a content element from a storage location corresponding to the determined element meaning, and determining the acquired content element as a content element required for displaying the target information content.

In order to overcome the problems of display errors caused by that the DDIC of the smart terminal fails to know the specific meaning of a content element, the present disclosure provides a method and apparatus for always-on display, and a computer-readable storage medium.

According to a first aspect of the present disclosure, there is provided a method for always-on display. The method includes: acquiring a plurality of content elements, a plurality of element meanings and a plurality of storage locations required for always-on display, wherein each of the plurality of content elements corresponds to an element meaning and a storage location; determining target information content, wherein the target information content is information content that needs to be displayed through always-on display function; acquiring a content element required for displaying the target information content from the plurality of content elements based on the target information content, the plurality of element meanings, and the plurality of storage locations; and displaying the target information content through the always-on display function based on the acquired content element.

According to a second aspect of the present disclosure, there is provided an apparatus for always-on display. The apparatus includes: a first acquiring module configured to acquire a plurality of content elements, a plurality of element meanings and a plurality of storage locations required for always-on display, wherein each of the plurality of content elements corresponds to an element meaning and a storage location; a determining module configured to determine target information content, wherein the target information content is information content that needs to be displayed through always-on display function; a second acquiring module configured to acquire a content element required for displaying the target information content from the plurality of content elements based on the target information content, the plurality of element meanings, and the plurality of storage locations; and a displaying module configured to display the target information content through the always-on display function based on the acquired content element.

According to a third aspect of the present disclosure, there is provided an apparatus for always-on display. The apparatus includes: a processor; and a memory for storing instructions executable by the processor, wherein the processor is configured to perform the steps of any of the methods according to the first aspect described above.

According to a fourth aspect of the present disclosure, there is provided a computer-readable storage medium having instructions stored thereon that, when executed by a processor, cause the processor to implement the steps of any of the methods according to the first aspect described above.

The present disclosure may include dedicated hardware implementations such as application specific integrated circuits, programmable logic arrays and other hardware devices. The hardware implementations can be constructed to implement one or more of the methods described herein. Applications that may include the apparatus and systems of various examples can broadly include a variety of electronic and computing systems. One or more examples described herein may implement functions using two or more specific interconnected hardware modules or devices with related control and data signals that can be communicated between and through the modules, or as portions of an application-specific integrated circuit. Accordingly, the computing system disclosed may encompass software, firmware, and hardware implementations. The terms "module," "sub-module," "circuit," "sub-circuit," "circuitry," "sub-circuitry," "unit,"

or "sub-unit" may include memory (shared, dedicated, or group) that stores code or instructions that can be executed by one or more processors.

A person skilled in the art, when considering the descriptions and practicing the present disclosure disclosed here, will easily conceive other implementations of the present disclosure. The present application is intended to cover any variation, use or adaptation of the disclosure, which follow general principle of the disclosure and include general knowledge or customary technical means in the art that are not disclosed herein. The descriptions and embodiments are only regarded to be exemplary.

It will be appreciated that the disclosure is not limited to the exact construction that has been described above and illustrated in the accompanying drawings, and that various modifications and changes can be made without departing from the scope thereof. It is intended that the scope of the disclosure only be limited by the appended claims.

What is claimed is:

1. A method for always-on display applied in a Display Driver Integrated Circuit (DDIC), comprising:
   acquiring a plurality of content elements, a plurality of element meanings and a plurality of storage locations required for the always-on display, wherein each content element corresponds to an element meaning and a storage location;
   determining target information content, wherein the target information content needs to be displayed through an always-on display function;
   acquiring a content element required for displaying the target information content from the plurality of content elements based on the target information content, the plurality of element meanings, and the plurality of storage locations, wherein the each content element comprises a stored image representing each character of a system time, wherein the displayed target information content comprises the system time and the acquired content element comprises a reference time, and the system time is obtained by adding the reference time to an elapsed time value that is obtained using an oscillator of the DDIC to start to count when the reference time is acquired; and
   displaying the target information content through the always-on display function based on the acquired content element,
   wherein acquiring the content element required for displaying the target information content from the plurality of content elements based on the target information content, the plurality of element meanings, and the plurality of storage locations comprises:
   determining a plurality of display elements comprised in the system time;
   analyzing an element meaning of each of the plurality of display elements;
   selecting, from the plurality of element meanings, an element meaning which is consistent with the analyzed element meaning of each of the plurality of display elements, and
   acquiring a content element corresponding to the display element from a storage location corresponding to the determined element meaning; and
   determining the acquired content element corresponding to each of the display elements as the content element required for displaying the target information content.

2. The method of claim 1, wherein determining the target information content comprises:
   acquiring the reference time, which is the system time acquired from an application processor (AP) when a screen is turned off;
   counting time from acquiring the reference time to obtain the elapsed time value for indicating the time that has elapsed since the reference time is acquired;
   when the system time is required to be displayed through the always-on display function, adding the reference time to the elapsed time value obtained by counting the time to obtain the system time; and
   determining the system time as the target information content.

3. The method of claim 1, after determining the plurality of display elements comprised in the system time, further comprising:
   determining a display order of the plurality of display elements;
   wherein displaying the target information content through the always-on display function based on the acquired content element comprises:
   displaying content elements corresponding to the plurality of display elements in the display order at preset display positions, wherein the preset display positions are preset positions at which the plurality of display elements are to be displayed in the screen.

4. The method of claim 1, wherein determining the target information content comprises:
   when a notification message is received, determining the notification message as the target information content, wherein the notification message indicates that new information is received.

5. The method of claim 4, wherein acquiring the content element required for displaying the target information content from the plurality of content elements based on the target information content, the plurality of element meanings, and the plurality of storage locations comprises:
   determining a message type to which the notification message belongs;
   determining an element meaning that is consistent with the message type from the plurality of element meanings; and
   acquiring the content element from a storage location corresponding to the determined element meaning, and determining the acquired content element as required for displaying the target information content.

6. An apparatus for always-on display applied in a Display Driver Integrated Circuit (DDIC), comprising:
   a processor; and
   a memory for storing instructions executable by the processor,
   wherein the processor is configured to:
   acquire a plurality of content elements, a plurality of element meanings and a plurality of storage locations required for the always-on display, wherein each content element corresponds to an element meaning and a storage location;
   determine target information content, wherein the target information content needs to be displayed through an always-on display function;
   acquire a content element required for displaying the target information content from the plurality of content elements based on the target information content, the plurality of element meanings, and the plurality of storage locations, wherein the each content element comprises a stored image representing each character of a system time, wherein the displayed target information content comprises the system time and the acquired content element comprises a reference time, and the system time is obtained by adding the reference time to an elapsed time value that is obtained using an oscillator of the DDIC to start to count when the reference time is acquired; and display the target information content through the always-on display function based on the acquired content element, wherein the processor is further configured to acquire the content element required for displaying the target information content by performing operations of:

determining a plurality of display elements comprised in the system time;

analyzing an element meaning of each of the plurality of display elements;

selecting, from the plurality of element meanings, an element meaning which is consistent with the analyzed element meaning of each of the plurality of display elements, and acquiring a content element corresponding to the display element from a storage location corresponding to the determined element meaning; and determining the acquired content element corresponding to each of the display elements as the content element required for displaying the target information content.

7. The apparatus of claim 6, wherein the processor is configured to:

acquire the reference time, which is the system time acquired from an application processor (AP) when a screen is turned off;

count time from acquiring the reference time to obtain the elapsed time value for indicating the time that has elapsed since the reference time is acquired;

when the system time is required to be displayed through the always-on display function, add the reference time to the elapsed time value obtained by counting the time to obtain the system time; and determine the system time as the target information content.

8. The apparatus of claim 6, wherein the processor is configured to:

determine a display order of the plurality of display elements;

display content elements corresponding to the plurality of display elements in the display order at preset display positions, wherein the preset display positions are preset positions at which the plurality of display elements are to be displayed in the screen.

9. The apparatus of claim 6, wherein the processor is configured to:

when a notification message is received, determine the notification message as the target information content, wherein the notification message is a message indicates that new information is received.

10. The apparatus of claim 9, wherein the processor is configured to:

determine a message type to which the notification message belongs;

determine an element meaning that is consistent with the message type from the plurality of element meanings; and acquire the content element from a storage location corresponding to the determined element meaning, and determine the acquired content element as required for displaying the target information content.

11. A non-transitory computer-readable storage medium having instructions stored thereon that, when executed by a processor, cause the processor to:

acquire a plurality of content elements, a plurality of element meanings and a plurality of storage locations required for the always-on display, wherein each content element corresponds to an element meaning and a storage location;

determine target information content, wherein the target information content needs to be displayed through an always-on display function;

acquire a content element required for displaying the target information content from the plurality of content elements based on the target information content, the plurality of element meanings, and the plurality of storage locations, wherein the each content element comprises a stored image representing each character of a system time, wherein the displayed target information content comprises the system time and the acquired content element comprises a reference time, and the system time is obtained by adding the reference time to an elapsed time value that is obtained using an oscillator of the DDIC to start to count when the reference time is acquired; and display the target information content through the always-on display function based on the acquired content element, wherein the instructions, when executed by the processor, cause the processor to acquire the content element required for displaying the target information content by performing operations of:

determining a plurality of display elements comprised in the system time;

analyzing an element meaning of each of the plurality of display elements;

selecting, from the plurality of element meanings, an element meaning which is consistent with the analyzed element meaning of each of the plurality of display elements, and acquiring a content element corresponding to the display element from a storage location corresponding to the determined element meaning; and determining the acquired content element corresponding to each of the display elements as the content element required for displaying the target information content.

12. The non-transitory computer-readable storage medium of claim 11, wherein the instructions further cause the processor to:

acquire the reference time, which is the system time acquired from an application processor (AP) when a screen is turned off;

count time from acquiring the reference time to obtain the elapsed time value for indicating the time that has elapsed since the reference time is acquired;

when the system time is required to be displayed through the always-on display function, add the reference time to the elapsed time value obtained by counting the time to obtain the system time; and determine the system time as the target information content.

13. The non-transitory computer-readable storage medium of claim 11, wherein the instructions further cause the processor to:

determine a display order of the plurality of display elements;

display content elements corresponding to the plurality of display elements in the display order at preset display positions, wherein the preset display positions are preset positions at which the plurality of display elements are to be displayed in the screen.

14. The non-transitory computer-readable storage medium of claim 11, wherein the instructions further cause the processor to:
when a notification message is received, determine the notification message as the target information content, wherein the notification message is a message indicates that new information is received.

15. The non-transitory computer-readable storage medium of 14, wherein the instructions further cause the processor to:
determine a message type to which the notification message belongs;
determine an element meaning that is consistent with the message type from the plurality of element meanings; and
acquire the content element from a storage location corresponding to the determined element meaning, and determine the acquired content element as required for displaying the target information content.

* * * * *